United States Patent
Kim et al.

(10) Patent No.: US 8,780,848 B2
(45) Date of Patent: Jul. 15, 2014

(54) METHOD AND APPARATUS FOR PERSISTENT RESOURCE ALLOCATION IN A WIRELESS ACCESS SYSTEM

(75) Inventors: Jeongki Kim, Anyang-si (KR); Giwon Park, Anyang-si (KR); Youngsoo Yuk, Anyang-si (KR); Jin Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 95 days.

(21) Appl. No.: 13/641,075

(22) PCT Filed: Apr. 15, 2011

(86) PCT No.: PCT/KR2011/002721
§ 371 (c)(1),
(2), (4) Date: Oct. 12, 2012

(87) PCT Pub. No.: WO2011/129660
PCT Pub. Date: Oct. 20, 2011

(65) Prior Publication Data
US 2013/0028227 A1    Jan. 31, 2013

Related U.S. Application Data

(60) Provisional application No. 61/324,307, filed on Apr. 15, 2010.

(30) Foreign Application Priority Data

Apr. 15, 2011 (KR) ................ 10-2011-0035131

(51) Int. Cl.
*H04W 4/00* (2009.01)
*H04W 72/04* (2009.01)

(52) U.S. Cl.
CPC ............ *H04W 72/04* (2013.01); *H04W 72/042* (2013.01)

USPC ..................................... 370/329

(58) Field of Classification Search
CPC ... H04W 4/00; H04W 72/04; H04W 72/0406; H04W 72/0413; H04W 72/042; H04W 72/0426; H04W 72/0433; H04W 72/044; H04W 72/0446; H04W 72/0453; H04W 72/046; H04W 72/0466; H04W 72/0473; H04W 88/02; H04B 7/26; H04J 11/00
USPC ................................... 370/320, 441
See application file for complete search history.

(56) References Cited

U.S. PATENT DOCUMENTS 7,970,906 B2 * 6/2011 Oh et al. ............... 709/226
(Continued)

OTHER PUBLICATIONS

Kim et al, De-allocation method of long cycle persistent allocation, IEEE, 5 pages, Nov. 2011.*
Iera, Antonio et al., "Call admission control and resource management issues for real-time VBR traffic in ATM-satellite networks," IEEE JSAC, vol. 18, No. 11, pp. 2393-2403, Nov. 2000.

(Continued)

*Primary Examiner* — Frank Duong
(74) *Attorney, Agent, or Firm* — Lee, Hong, Degerman, Kang & Waimey (57) ABSTRACT

The present description relates to a method for persistent resource allocation in a wireless access system, comprising the following steps: receiving a first MAP message containing persistent resource allocation information from a base station; transceiving data bursts to/from the base station via the persistent resource domain contained in the persistent resource allocation information; and receiving a second MAP message containing persistent resource de-allocation type information from the base station, wherein said persistent resource de-allocation type information indicates whether a de-allocation of persistently allocated resources is a persistent de-allocation or a temporary de-allocation.

20 Claims, 4 Drawing Sheets

(56) References Cited

U.S. PATENT DOCUMENTS

| | | | |
|---|---|---|---|
| 8,009,620 B2* | 8/2011 | Zheng et al. | 370/329 |
| 8,155,067 B2* | 4/2012 | Wang et al. | 370/329 |
| 2009/0103487 A1* | 4/2009 | Oh et al. | 370/329 |

OTHER PUBLICATIONS

Konig, Wolfgang et al., "Reconfigurable Base Station Processing and Resource Allocation," Mobile and Wireless Communications Summit, pp. 1-5, Jul. 1-5, 2007.

* cited by examiner

METHOD AND APPARATUS FOR PERSISTENT RESOURCE ALLOCATION IN A WIRELESS ACCESS SYSTEM

CROSS-REFERENCE TO RELATED APPLICATIONS

This application is the National Stage filing under 35 U.S.C. 371 of International Application No. PCT/KR2011/002721, filed on Apr. 15, 2011, which claims the benefit of earlier filing date and right of priority to Korean Patent Application No. 10-2011-0035131, filed on Apr. 15, 2011, and also claims the benefit of U.S. Provisional Application Ser. No. 61/324,307, filed on Apr. 15, 2010, the contents of which are all hereby incorporated by reference herein in their entirety.

TECHNICAL FIELD

The present invention relates to a wireless access system, and more specifically, to a method and apparatus for persistent resource allocation.

BACKGROUND ART

Figure 1:
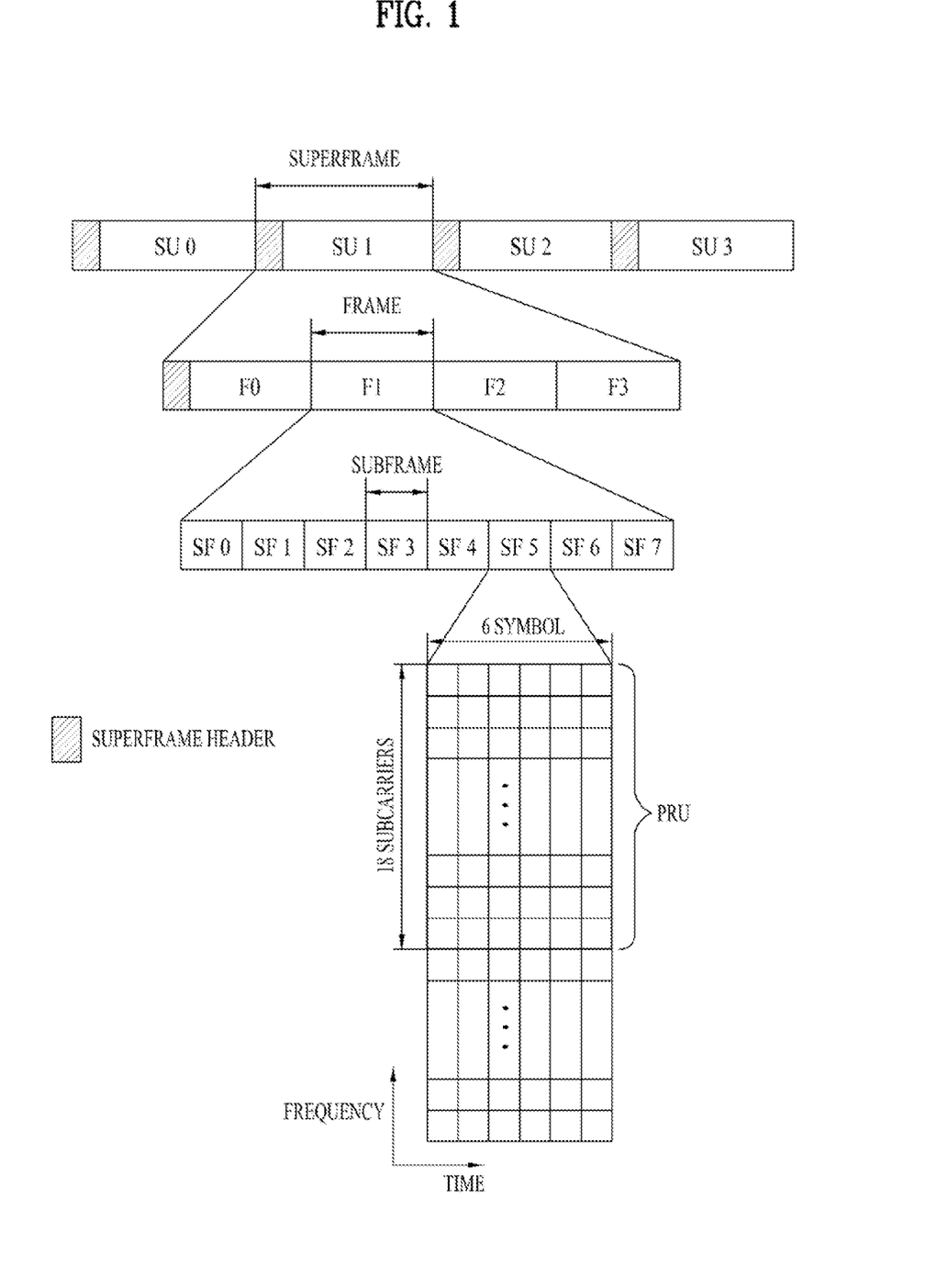
FIG. 1 illustrates an exemplary frame structure.

FIG. 1 illustrates an exemplary frame structure.

Referring to FIG. 1, a superframe (SF) includes a superframe header (SFH) and 4 frames F0, F1, F2 and F3. The frames in the superframe may have the same duration. While each superframe is 20 ms and each frame is 5 ms in FIG. 1, the sizes of the superframe and frame are not limited thereto. The duration of a superframe, the number of frames included in a superframe, and the number of subframes included in a frame may vary. The number of subframes included in a frame may depend on channel bandwidth, the duration of a cyclic prefix (CP), etc.

A frame includes a plurality of subframes SF0, SF1, SF2, SF3, Sf4, SF5, SF6 and SF7. Each subframe may be used for uplink or downlink transmission. A subframe includes a plurality of orthogonal frequency division multiplexing (OFDM) symbols or orthogonal frequency division multiple access (OFDMA) symbols in the time domain and includes a plurality of subcarriers in the frequency domain.

An OFDM symbol represents a symbol period and may be referred to as an OFDMA symbol, SC-FDMA symbol, etc. according to multiple access scheme.

While a subframe is composed of 5, 6, 7 or 9 OFDMA symbols, the number of OFDMA symbols included in a subframe is not limited. The number of OFDMA symbols included in a subframe may depend on channel bandwidth, the duration of a CP, etc.

The type of a subframe may be defined according to the number of OFDMA symbols included in the subframe. For example, a type-1 subframe includes 6 OFDMA symbols, a type-2 subframe includes 7 OFDMA symbols, a type-3 subframe includes OFDMA symbols, and a type-4 subframe includes 9 OFDMA symbols. One frame may include subframes of the same type. Otherwise, one frame may include subframes of different types. That is, subframes included in a frame may have the same number of OFDMA symbols or different numbers of OFDMA symbols. Otherwise, the number of OFDMA symbols included in at least one subframe in a frame may differ from the number of OFDMA symbols of other subframes in the frame.

Time division duplexing (TDD) or frequency division duplexing (FDD) may be applied to frames. Subframes are used for uplink transmission or downlink transmission at the same frequency in different time periods in the TDD scheme. That is, subframes in a TDD frame are divided into uplink subframes and downlink subframes in the time domain. In the FDD scheme, subframes are used for uplink transmission or downlink transmission at different frequencies in the same time period.

That is, subframes included in an FDD frame are divided into uplink subframes and downlink subframes in the frequency domain. Uplink transmission and downlink transmission may be simultaneously performed while respectively occupying different frequency bands.

An SFH may carry an essential system parameter and system configuration information. The SFH may be located in the first subframe of a superframe. The SFH may occupy the last 5 OFDMA symbols in the first subframe.

The SFH may be classified into a primary SFH (P-SFH) and a secondary SFH (S-SFH). The P-SFH and S-SFH may be transmitted in each superframe. The S-SFH may be transmitted in two contiguous superframes. Information transmitted through the S-SFH may be divided into 3 sub-packets S-SFH SP1, S-SFH SP2 and S-SFH SP3. The sub-packets may be periodically transmitted at different intervals. Information transmitted through the sub-packets S-SFH SP1, S-SFH SP2 and S-SFH SP3 may have different degrees of importance. S-SFH SP1 may be transmitted at the shortest interval and S-SFH SP3 may be transmitted at the longest interval.

S-SFH SP1 includes information about network re-entry. S-SFH SP2 includes information about initial network entry and network discovery. S-SFH SP3 includes other important system information.

An OFDMA symbol includes a plurality of subcarriers, and the number of subcarriers is determined according to FFT size. Subcarriers may be classified into a data subcarrier for data transmission, a pilot subcarrier for various estimations, and a null carrier for a guard band and DC carrier.

Machine to Machine (M2M) Communication

Machine to machine (M2M) communication will now be described.

M2M communication refers to communication between electronic devices. In a broad sense, M2M communication means wired or wireless communication between electronic devices or communication between devices controlled by people. Recently, M2M communication generally refers to wireless communication between electronic devices, performed without human intervention. Performance or capability of M2M terminals used in a cellular network is poorer than that of general terminals.

An M2M environment has the following characteristics.
1. A large number of terminals per cell
2. A small quantity of data
3. Low frequency of transmission
4. A limited number of data characteristics
5. Insensitiveness to time delay.

Many terminals are present in a cell and they may be discriminated by type, class, service type, etc.

Particularly, the number of terminals may abruptly increase when M2M communication (or machine type communication (MTC)) is considered. M2M terminals may have the following characteristics according to services supported thereby.
1. M2M terminals intermittently transmit data. The M2M terminals may have periodicity.
2. The M2M terminals have low mobility or are fixed.
3. The M2M terminals are insensitive to latency in signal transmission.

M2M terminals having the above characteristics in a cell can transmit or receive signals to/from a base station or other terminals using a multi-hop configuration or a hierarchical structure.

That is, an M2M terminal may receive a signal from the base station and transmit the received signal to an M2M terminal located at a different layer or a lower layer, or receive a signal from other M2M terminals and transmit the signal to other M2M terminals or the base station. Otherwise, direct communication between M2M terminals may be performed without using a relay.

For signal transmission between M2M terminals, the M2M terminals may be connected in an upper/lower structure to transmit signals (although the upper/lower structure may not be employed in the case of direct communication between terminals, signal transmission may be described by applying the upper/lower structure to the direct communication between terminals).

In downlink transmission, for example, mobile station (MS) 1 receives a signal from the base station and transmits the received signal to MS 2. Here, MS 1 may transmit the signal to a lower MS as well as MS 2. MS 2 is a lower terminal of MS 1.

Upon reception of the signal from MS 1, MS 2 transmits the received signal to a lower MS. In this manner, the signal is transmitted to MS N. In this case, many terminals may be connected in a multi-hop or hierarchical structure between MS 2 and MS N.

Alternatively, in uplink transmission, signal transmission between M2M terminals may be performed as follows. A lower M2M terminal may transmit a signal to another M2M terminal or the base station using a higher M2M terminal.

DISCLOSURE

Technical Problem

M2M systems require a method for supporting applications that periodically generate traffic, that is, applications having a time controlled characteristic, such as smart metering.

The methods may include persistent allocation defined in conventional systems, ertPS and gGP services, etc. A conventional persistent scheduling method can be used for traffic having the time-controlled characteristic, and the corresponding traffic may have a time tolerant characteristic.

When the persistent scheduling method is used for traffic having these characteristics (time controlled and time tolerant), it may be necessary to allocate a persistently allocated resource to another terminal in order to send an urgent message at a specific time. Particularly, it is necessary to efficiently manage limited resources because a larger number of M2M devices is present in a cell than in a conventional system when the M2M application is supported.

For resource allocation using persistent scheduling, the base station transmits a persistent resource allocation MAP that indicates resource de-allocation (i.e., allocation period=0b00) to a terminal. To resume resource allocation, the base station transmits a persistent resource allocation MAP indicating resource allocation to the terminal.

Even when one-time or temporary resource de-allocation occurs, a MAP for resource de-allocation is transmitted as in the conventional method, and then the persistent resource allocation MAP is transmitted in the next period. This may generate an unnecessary MAP overhead during one-time resource allocation.

Accordingly, an object of the present invention is to provide a method for transmitting/receiving data to/from a base station through persistent resource allocation without transmitting a persistent resource allocation MAP in the case of temporary de-allocation by transmitting information indicating whether de-allocation of persistently allocation resources is permanent de-allocation or temporary de-allocation.

Technical Solution

According to an aspect of the present invention, a persistent resource allocation method in a wireless access system includes: receiving a first MAP message containing persistent resource allocation information from a base station; transceiving data bursts to/from the base station via a persistent resource region included in the persistent resource allocation information; and receiving a second MAP message containing persistent resource de-allocation type information from the base station, wherein the persistent resource de-allocation type information indicates whether de-allocation of persistently allocated resources is persistent de-allocation or temporary de-allocation.

The persistent resource allocation information may further include persistent resource allocation period information, wherein the persistent resource de-allocation type information is contained in the second MAP message when the persistent resource allocation period information indicates de-allocation of persistently allocated resources.

The second MAP message may further include persistent resource de-allocation section information when the persistent resource de-allocation type information indicates temporal de-allocation of persistently allocated resources.

The persistent resource de-allocation section information may indicate the duration of temporal de-allocation, the duration of temporal de-allocation being defined on a frame-by-frame basis.

Data bursts may be transmitted/receive to/from the base station through the persistent resource region included in the first MAP message after the persistent resource de-allocation section.

The persistent resource allocation method may further include receiving a third MAP message containing resource allocation information in the persistent resource de-allocation section; and transmitting uplink data bursts to the base station through a resource allocation region contained in the resource allocation information.

The first MAP message and the second MAP message may correspond to a persistent allocation A-MAP.

The third MAP message may be a basic assignment A-MAP IE.

The temporal de-allocation may be one-time de-allocation.

According to another aspect of the present invention, a mobile station performing persistent resource allocation in a wireless access system includes: a wireless communication unit for transceiving RF signals; and a controller connected to the wireless communication unit, wherein the controller is configured to control the wireless communication unit to receive a first MAP message including persistent resource allocation information from a base station, to control the wireless communication unit to transmit/receive data bursts to/from the base station through a persistent resource region included in the persistent resource allocation information, and to control the wireless communication unit to receive a second MAP message including persistent resource de-allocation type information from the base station, wherein the persistent resource de-allocation type information indicates whether de-allocation of persistently allocated resources is persistent de-allocation or temporary de-allocation.

The persistent resource allocation information may further include persistent resource allocation period information, wherein the persistent resource de-allocation type information is contained in the second MAP message when the persistent resource allocation period information indicates de-allocation of persistently allocated resources.

The second MAP message may further include persistent resource de-allocation section information when the persistent resource de-allocation type information indicates temporal de-allocation of persistently allocated resources.

The persistent resource de-allocation section information may indicate the duration of temporal de-allocation, the duration of temporal de-allocation being defined on a frame-by-frame basis.

The controller may control the wireless communication unit to transmit/receive data bursts to/from the base station through the persistent resource region included in the first MAP message after the persistent resource de-allocation section.

The controller may control the wireless communication unit to receive a third MAP message including resource allocation information from the base station in the persistent resource de-allocation section and control the wireless communication unit to transmit uplink data bursts to the base station through a resource allocation region contained in the resource allocation information.

Advantageous Effects

The present invention can reduce unnecessary PA A-MAP overhead generated during one-time or persistent (fixed) resource de-allocation by transmitting information indicating a persistent resource de-allocation type included in persistent allocation (PA) A-MAP to a terminal.

For example, when a terminal is informed of information indicating that only one-time persistent resource de-allocation occurs during a resource de-allocation, overhead of MAP transmitted to the terminal can be reduced by 50% (reduced from twice transmission to one-time transmission), as compared to conventional MAP overhead.

BEST MODE

Now, the above and other aspects of the present invention will be described in detail through preferred embodiments with reference to the accompanying drawings so that the present invention can be easily understood and realized by those skilled in the art. In the following description of the present invention, a detailed description of known functions and configurations incorporated herein will be omitted when it may obscure the subject matter of the present invention.

Embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is given centering on a data transmission and reception relationship between a base station and an MS. In this case, the base station is a terminal node of a network, which directly communicates with the MS. In some cases, a specific operation described as performed by the base station may be performed by an upper node of the BS.

Namely, it is apparent that, in a network comprised of a plurality of network nodes including a base station, various operations performed for communication with an MS may be performed by the base station, or network nodes other than the base station. The term 'base station (BS)' may be replaced with the term 'fixed station', 'Node B', 'enhanced Node B (eNode B or eNB)', 'access point', etc. The term 'MS' may be replaced with the term 'User Equipment (UE)', 'Mobile Subscriber Station (MSS)', 'mobile terminal', etc.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Specific terms used in the following description are provided to aid in understanding the present invention and may be changed in the technical scope of the present invention.

Persistent Scheduling

Persistent scheduling in 802.16e or 16m is a technique proposed to reduce resource allocation overhead when resources are allocated for connection having a periodic traffic pattern with a relatively fixed packet size, such as VoIP.

For persistent (or fixed) resource allocation, a persistent resource allocation MAP (e.g., DL/UL persistent allocation MAP/A-MAP IE) is transmitted to a terminal. A resource allocated through this persistent resource allocation control information is assigned with periodicity through information contained in the corresponding control information MAP without having other control information.

That is, allocated persistent resources are maintained until de-allocation or change occurs or error is generated. For example, an allocated resource is de-allocated when a persistent resource allocation MAP for resource de-allocation is transmitted.

Table 1 shows an exemplary DL persistent allocation A-MAP format defined in 802.16m.

TABLE 1

| Syntax | Size in bits | Description/Notes |
| --- | --- | --- |
| DL Persistent Allocation A-MAP_IE( ){ | | |
| A-MAP IE Type | 4 | DL Persistent AllocationA-MAP IE |
| Allocation Period | 2 | Period of persistent allocationIf (Allocation Period ==0b00), it indicates the deallocation of a persistently allocated resource.0b00: deallocation0b01: 2 frames0b10: 4 frames0b11: 8 frames |
| If (Allocation Period ==0b00){ | | |
| Resource Index | 11 | Confirmation of the resource index for a previously assigned persistent resource that has been deallocated5 MHz: 0 in first 2 MSB bits + 9 bits for resource index 10 MHz: 11 bits for resource index20 MHz: 11 bits for resource indexResource index includes location and allocation size |
| Long TTI Indicator | 1 | Indicates number of AAI subframes spanned by the allocated resource.0b0: 1 AAI subframe (default)0b1: 4 DL AAI subframes for FDD or all DL AAI subframes for TDD |
| HFA | 6 | Explicit Index for HARQ Feedback Allocation to acknowledge receipt of deallocation A-MAP IE |
| Reserved } else if (Allocation != 0b00){ | 16 | |
| ... | ... | ... |
| Resource Index | 11 | 5 MHz: 0 in first 2 MSB bits + 9 bits for resource index10 MHz: 11 bits for resource index20 MHz: 11 bits for resource indexResource index includes location and allocation size |
| Long TTI Indicator | 1 | Indicates number of AAI subframes spanned by the allocated resource. 0b0: 1 AAI subframe (default)0b1: 4 DL AAI subframes for FDD or all DL AAI subframes for TDD |
| ... | ... | ... |

Referring to Table 1, the allocation period indicates a period of re-allocation of a resource allocated by a MAP. For example, the allocation period set to '0b10' indicates that a resource is allocated to the same position in the same subframe after 4 frames. The allocation period set to '0b00' indicates that the corresponding resource is de-allocated.

A description will be given of a method for reducing a PA A-MAP transmission overhead generated during one-time or temporary resource de-allocation in persistent resource allocation methods proposed in the present invention.

The methods proposed in the present invention can be useful for fixed (persistent) resource allocation of M2M devices having the time tolerant characteristic.

Figure 2:
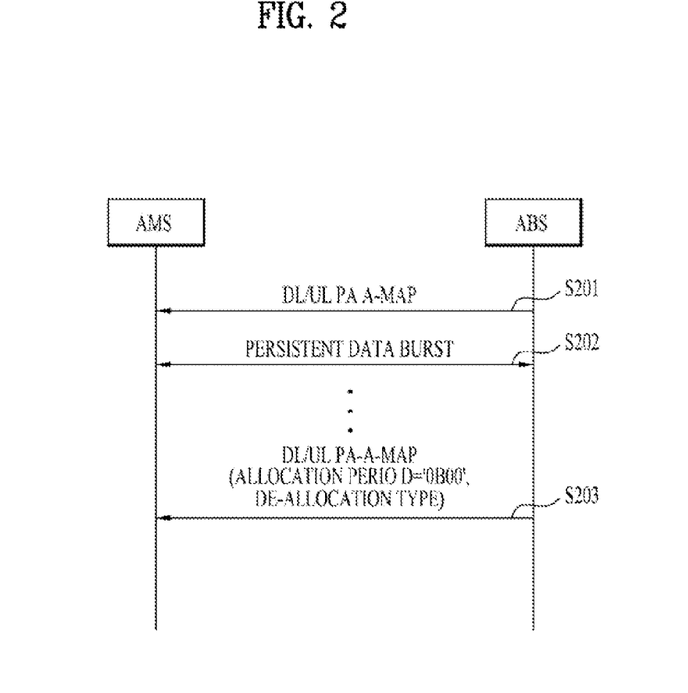
FIG. 2 is a flowchart illustrating a persistent resource allocation method according to an embodiment of the present invention.

FIG. 2 is a flowchart illustrating a persistent resource allocation method according to an embodiment of the present invention.

Referring to FIG. 2, an advanced mobile station (AMS) receives a first MAP message including persistent resource allocation information from an advanced BS (ABS) (S201). Here, the first MAP message refers to a DL/UL PA A-MAP. However, the first MAP message is not limited thereto and may be a MAC control message or a header.

As described above, the persistent resource allocation information includes persistent resource allocation period information, a resource index to which a persistent resource is allocated, etc. contained in the DL/UL PA A-MAP.

The AMS persistently transmits/receives a downlink or uplink data burst to/from the ABS through a persistent resource region included in the persistent resource allocation information (S202).

Then, the AMS receives a second MAP message including persistent resource de-allocation type information from the ABS (S203). The second MAP message refers to a DL/UL PA A-MAP. In this case, the persistent resource allocation period information contained in the PA A-MAP is set to '0b00' (de-allocation), for example.

The persistent resource de-allocation type information included in the PA A-MAP indicates whether de-allocation of persistently allocated resources is permanent de-allocation or temporal de-allocation.

Here, temporal de-allocation refers to one-time de-allocation.

That is, temporal de-allocation may indicate persistent resource de-allocation occurring in one frame or persistent resource de-allocations continuously occurring in a plurality of frames.

When persistent resource de-allocations continuously occur in a plurality of frames, the second MAP message includes resource de-allocation section information (Num_de-allocation) (e.g., the number of resource de-allocation frames) that indicates the number of consecutive de-allocations.

Accordingly, 1) when a previously allocated persistent resource is permanently de-allocated at a PA A-MAP reception time, the AMS can be allocated a persistent resource by the ABS through a bandwidth request procedure when the AMS requires persistent resource allocation on the basis of the persistent resource de-allocation type information contained in the DL/UL PA A-MAP received from the ABS. 2) When a persistently allocated resource is temporarily de-allocated, the AMS can transmit/receive data bursts to/from the ABS through a previously allocated persistent resource region in the next period after temporary de-allocation on the basis of the persistent resource de-allocation type information contained in the DL/UL PA A-MAP received from the ABS.

Figure 3:
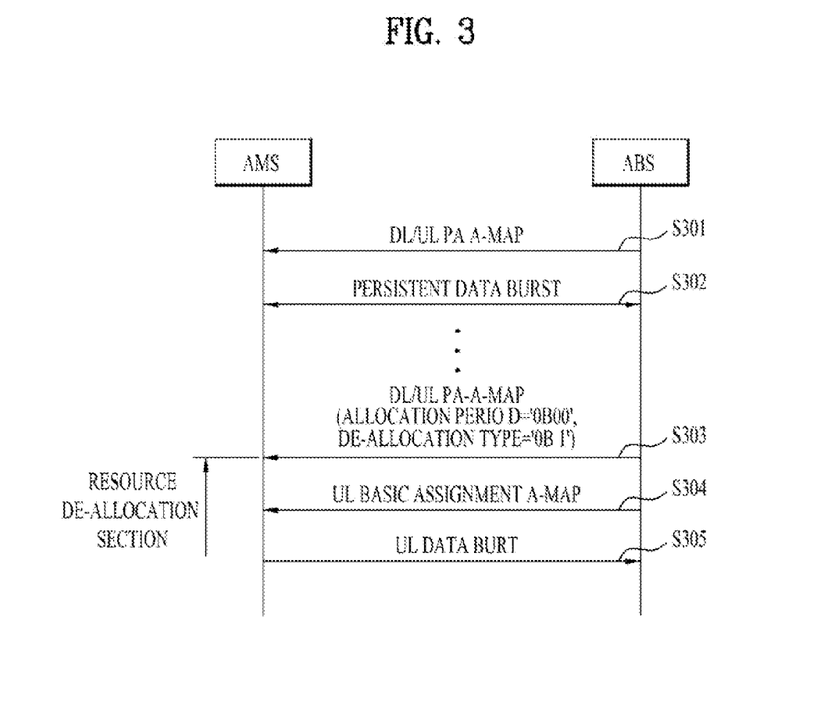
FIG. 3 is a flowchart illustrating a method of transmitting an uplink (UL) data burst to a base station in a persistent resource de-allocation section through a UL basic assignment A-MAP information element (IE) according to an embodiment of the present invention.

FIG. 3 is a flowchart illustrating a method of transmitting a UL data burst to the ABS in a persistent resource de-allocation section through a UL basic assignment A-MAP IE according to an embodiment of the present invention.

Since S301 to S303 correspond to S201 to S203, descriptions of the same steps are omitted and only different parts are described.

When the AMS receives a PA A-MAP containing persistent resource de-allocation type information that indicates temporal de-allocation of persistently allocated resources from the ABS, the AMS receives the UL basic assignment A-MAP IE from the ABS in a temporary de-allocation section (S304).

Then, the AMS transmits a UL data burst to the ABS through a resource region assigned through the received UL basic assignment A-MAP IE (S305).

Table 2 shows an exemplary DL/UL PA A-MAP format included in resource de-allocation type information according to an embodiment of the invention.

TABLE 2

| Syntax | Size in bits | Description/Notes |
|---|---|---|
| DL/UL Persistent Allocation A-MAP_IE( ){ | — | |
| A-MAP IE Type | 4 | DL/UL Persistent AllocationA-MAP IE |
| Allocation Period | 2 | Period of persistent allocationIf (Allocation Period ==0b00), it indicates the deallocation of a persistently allocated resource. 0b00: deallocation0b01: 2 frames0b010: 4 frames0b11: 8 frames |
| If (Allocation Period ==0b00){ | | |
| ... | ... | ... |
| De-allocation type | 1 | 0b0: Permanent deallocation 0b1: One-time de-allocation |
| Reserved | 15 | |
| ... | ... | ... |

Referring to Table 2, when allocation period information that indicates persistent resource de-allocation is set, the DL/UL PA A-MAP includes resource de-allocation type information indicating whether the persistent resource de-allocation is one-time de-allocation or permanent de-allocation.

For example, the resource de-allocation type information 'De-allocation type' indicates a permanent resource de-allocation when set to '0b0'. The permanent de-allocation represents that de-allocation continues. In this case, the ABS needs to transmit a persistent allocation A-MAP to the AMS in order to allocate a persistent resource to the AMS again.

The resource de-allocation type information 'De-allocation type' indicates one-time resource de-allocation when set to '0b1'. One-time de-allocation represents that de-allocation is performed once when the corresponding PA A-MAP is transmitted, and previous persistent allocation can be continuously used in the following periods.

Permanent De-allocation

A description will be given of a persistent resource allocation method when the resource de-allocation type information proposed by the present invention indicates permanent de-allocation.

Figure 4:
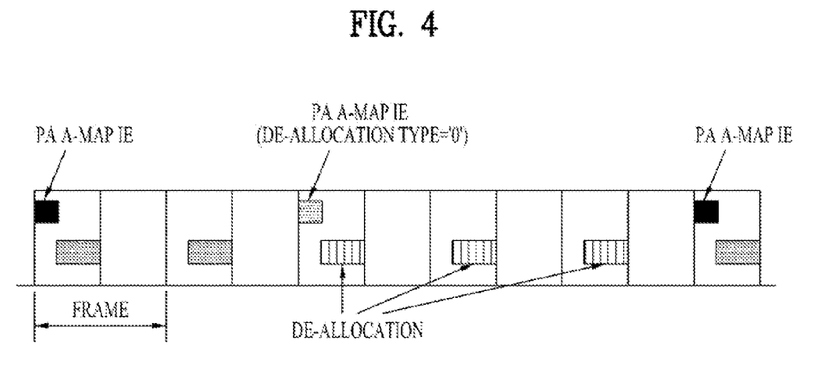
FIG. 4 illustrates a persistent resource allocation method when persistent resource de-allocation type information indicates permanent de-allocation of persistently allocated resources according to an embodiment of the present invention.

FIG. 4 illustrates a persistent resource allocation method when the persistent resource de-allocation type information indicates permanent de-allocation of persistently allocated resources according to an embodiment of the present invention.

Referring to FIG. 4, the AMS receives a PA A-MAP that indicates resource de-allocation (e.g., sets the allocation period to '0b00') from the ABS for an allocated persistent resource. In this case, the PA A-MAP includes de-allocation type information.

Here, when the de-allocation type information indicates a permanent de-allocation, the AMS determines that the allocated persistent resource is completely de-allocated before the PA A-MAP is received from the ABS again.

When a packet to be transmitted to the ABS is generated, the AMS starts a bandwidth request procedure to request the ABS to assign a resource thereto.

In this case, the ABS assigns a persistent resource to the AMS by transmitting a PA A-MAP to the AMS.

One-time De-allocation

Figure 5:
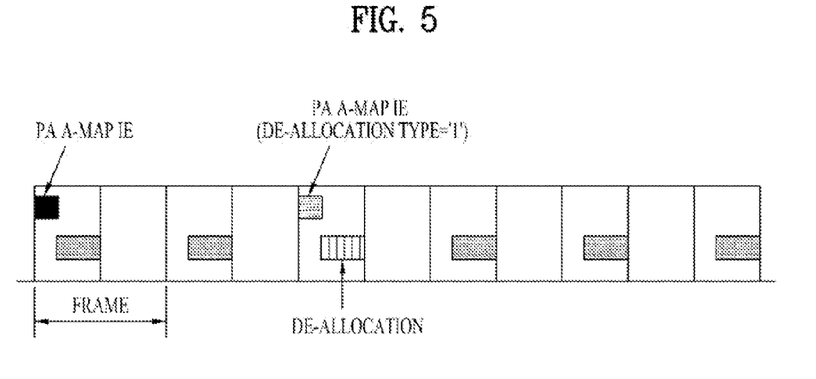
FIG. 5 illustrates a persistent resource allocation method when persistent resource de-allocation type information indicates one-time de-allocation of persistently allocated resources according to an embodiment of the present invention.

FIG. 5 illustrates a persistent resource allocation method when the persistent resource de-allocation type information indicates one-time de-allocation of persistently allocated resources according to an embodiment of the present invention.

Referring to FIG. 5, when the AMS receives a PA A-MAP containing the persistent resource de-allocation type information that indicates one-time de-allocation from the ABS, the AMS can recognize that the persistently allocated resources are de-allocated once at the time when the PA A-MAP is received from the ABS. Here, the time when the PA A-MAP is received may correspond to the frame in which the PA A-MAP is received.

Accordingly, the AMS maintains parameters related to the existing persistent allocation without using resources at the time when the PA A-MAP is received.

That is, even when resource de-allocation occurs, the AMS transmits a generated packet to the ABS using the existing persistent resource in the period following resource de-allocation without performing bandwidth request to request the ABS to assign resources to the AMS.

Here, when the ABS performs one-time de-allocation for a specific AMS, the ABS can allocates a resource to the specific AMS by transmitting a UL basic assignment A-MAP IE to the AMS prior to the next transmission period after the one time de-allocation such that the AMS can transmit a packet to the ABS.

That is, the specific AMS can expect to be assigned a resource by receiving the UL basic assignment A-MAP IE from the ABS before the next transmission period.

Furthermore, even if the AMS, which has received the persistent allocation A-MAP containing persistent resource de-allocation type information indicating one-time de-allocation, has a packet to be transmitted to the ABS at the time when the persistent allocation A-MAP is received, the AMS awaits a grant from the ABS for a predetermined time (until the next transmission period) without performing a bandwidth request procedure.

If the AMS does not receive the grant for the predetermined time, the AMS can be assigned a resource by the ABS through the bandwidth request procedure.

Temporal De-allocation

Table 3 shows another exemplary DL/UL PA A-MAP format including resource de-allocation type information and resource de-allocation section information according to an embodiment of the present description.

TABLE 3

| Syntax | Size in bits | Description/Notes |
|---|---|---|
| DL/UL Persistent Allocation A-MAP_IE( ){ | — | |
| A-MAP IE Type | 4 | DL/UL Persistent Allocation A-MAP IE |
| Allocation Period | 2 | Period of persistent allocation If (Allocation Period==0b00), it indicates the de-allocation of a persistently allocated resource. 0b00: de-allocation 0b01: 2 frames, 0b10: 4 frames, 0b11: 8 frames |

TABLE 3-continued

| Syntax | Size in bits | Description/Notes |
|---|---|---|
| If (Allocation Period==0b00){ | | |
| ... | ... | ... |
| De-allocation type | 1 | 0b0: Permanent de-allocation, 0b1: Temporal de-allocation |
| If (De-allocation type==0b1){ | | |
| Num_de-allocation | 2 | Indicates the number of consecutive de-allocations. Ex) 0b00: one time, 0b01: twice, 0b10: three times, 0b11: four times |

Table 3 shows a case in which the resource de-allocation type information indicates temporal de-allocation instead of one-time de-allocation of Table 2.

Referring to FIG. 3, the resource de-allocation type information indicates permanent resource de-allocation or temporal resource de-allocation. When the resource de-allocation type information indicates temporal de-allocation, the resource de-allocation section information (Num_de-allocation) indicates the duration of resource de-allocation.

For example, the resource de-allocation type information (De-allocation Type) set to '0b1' indicates temporary de-allocation.

Here, the information (Num_de-allocation) about the number of contiguous de-allocations is included in the PA A-MAP.

The Num_de-allocation information indicates how many frames correspond to de-allocation from the frame in which the PA A-MAP is received.

If the Num_de-allocation information indicates N, persistent allocation is automatically applied to an AMS after N de-allocations.

When the ABS performs temporal de-allocation for a specific AMS, the ABS may allocate a resource to the AMS using the UL basic assignment A-MAP IE before the next persistent allocation starts after temporal de-allocation such that the AMS can transmit packets.

The AMS for which temporal de-allocation has been performed may expect to be allocated a resource using the UL basic assignment A-MAP IE from the ABS before the next persistent allocation starts.

Figure 6:
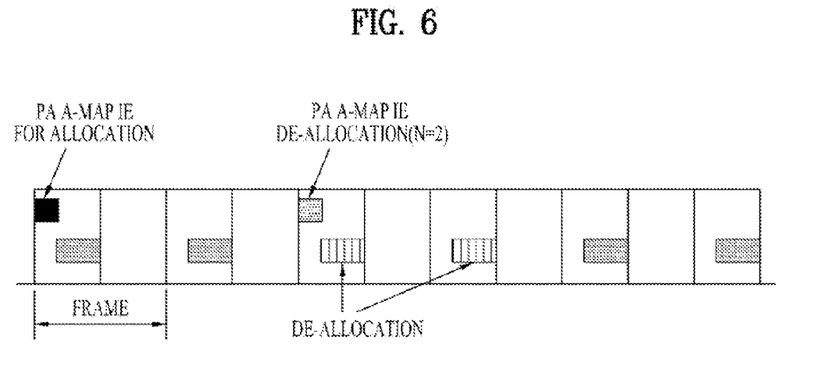
FIG. 6 illustrates a persistent resource allocation method when persistent resource de-allocation type information indicates temporary de-allocation according to an embodiment of the present invention.

FIG. 6 illustrates a persistent resource allocation method when the persistent resource de-allocation type information indicates temporal de-allocation according to an embodiment of the present description.

Referring to FIG. 6, the ABS sets the resource de-allocation type information to '0b1' (temporal de-allocation), for example, and transmits a PA A-MAP containing the resource de-allocation type information to the AMS.

As shown in FIG. 6, a temporal resource de-allocation section lasts for 2 frames from the frame in which the PA A-MAP is received. That is, a persistent resource is de-allocated for the AMS for 2 frames from the frame in which the PA A-MAP is received and a persistent resource is allocated again to the AMS from the next period.

Figure 7:
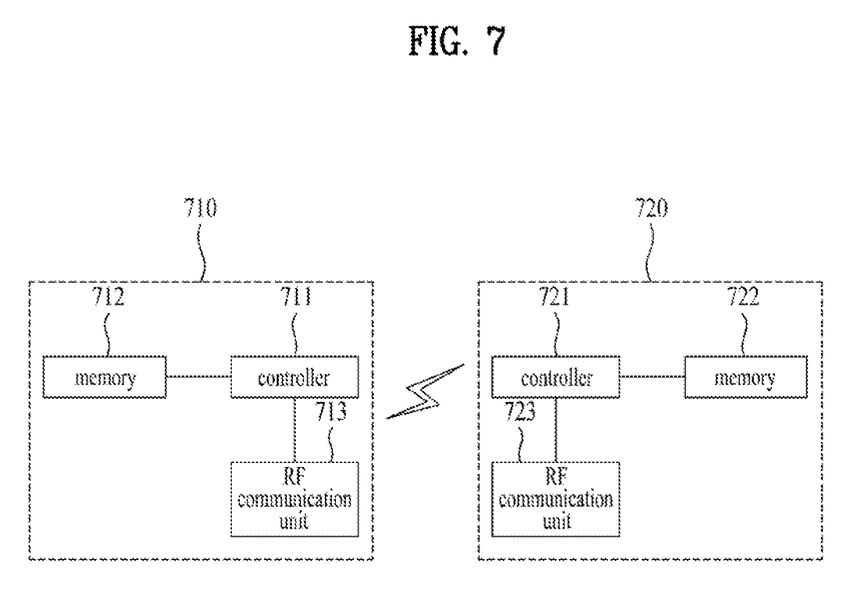
FIG. 7 is a block diagram of an RF communication system according to an embodiment of the present invention.

FIG. 7 is a block diagram of an RF communication system according to an embodiment of the present invention.

An ABS 710 includes a controller 711, a memory 712 and a radio frequency (RF) communication unit 713.

The controller 711 implements proposed functions, procedures and/or methods. RF interface protocol layers may be embodied by the controller 711.

The controller 711 may control the RF communication unit 713 to transmit a PA A-MAP containing resource de-allocation type information that indicates permanent or temporal de-allocation to an AMS 720.

The memory 712 is connected to the controller 711 and stores protocols or parameters for E-MBS related parameter update. The RF communication unit 713 is connected to the controller 711 to transmit and/or receive RF signals.

The AMS 720 includes a controller 721, a memory 722 and an RF communication unit 723.

The controller 721 implements proposed functions, procedures and/or methods. RF interface protocol layers may be embodied by the controller 721.

When the controller 721 receives the PA A-MAP containing the resource de-allocation type information that indicates permanent or temporal de-allocation, the controller 721 may control the RF communication unit 723 to transmit/receive data bursts to/from the ABS through a previously allocated persistent resource region after temporal de-allocation.

The memory 722 is connected to the controller 711 and stores protocols or parameters for E-MBS related parameter update. The RF communication unit 723 is connected to the controller 721 to transmit and/or receive RF signals.

The controllers 711 and 721 may include application-specific integrated circuits (ASICs), different chip-sets, logic circuits and/or data processing devices.

The invention claimed is:

1. A persistent resource allocation method at a mobile station in a wireless access system, the method comprising:
   receiving a first MAP message including persistent resource de-allocation type information from a base station, wherein the persistent resource de-allocation type information indicates a permanent de-allocation or a temporal de-allocation; and
   de-allocating a persistently allocated resource if the persistent resource de-allocation type information indicates the permanent de-allocation.

2. The method according to claim 1, wherein:
   the first MAP message further includes persistent resource allocation period information; and
   the persistent resource de-allocation type information is included in the first MAP message when the persistent resource allocation period information indicates de-allocation.

3. The method according to claim 1, wherein the first MAP message further includes information about a persistent resource de-allocation section when the persistent resource de-allocation type information indicates the temporal de-allocation.

4. The method according to claim 3, wherein the information about the persistent resource de-allocation section indicates a duration of the temporal de-allocation, the duration of the temporal de-allocation being defined on a frame-by-frame basis.

5. The method according to claim 3, further comprising transmitting data bursts to the base station or receiving data bursts from the base station via a persistent resource region included in the first MAP message after the persistent resource de-allocation section.

6. The method according to claim 1, further comprising:
   receiving a second MAP message including resource allocation information for a persistent resource de-allocation section; and
   transmitting uplink data bursts to the base station via a resource allocation region contained in the resource allocation information.

7. The method according to claim 1, wherein the first MAP message corresponds to a persistent allocation A-MAP.

8. The method according to claim 6, wherein the second MAP message is a basic assignment A-MAP IE.

9. The method according to claim 1, wherein the temporal de-allocation is a one-time de-allocation.

10. The method according to claim 3, wherein the temporal de-allocation is a one-time de-allocation.

11. A mobile station performing persistent resource allocation in a wireless access system, the mobile station comprising:
a wireless communication unit for transceiving radio frequency (RF) signals; and
a controller connected to the wireless communication unit, wherein the controller is configured to:
control the wireless communication unit to receive a first MAP message including persistent resource de-allocation type information from a base station,
wherein the persistent resource de-allocation type information indicates a permanent de allocation or a temporal de-allocation; and
de-allocate a persistently allocated resource if the persistent resource de-allocation type information indicates the permanent de-allocation.

12. The mobile station according to claim 11, wherein the first MAP message further includes information about a persistent resource de-allocation section when the persistent resource de-allocation type information indicates the temporal de-allocation.

13. The mobile station according to claim 12, wherein the information about the persistent resource de-allocation section indicates a duration of the temporal de-allocation, the duration of the temporal de-allocation being defined on a frame-by-frame basis.

14. The mobile station according to claim 12, wherein the controller is further configured to control the wireless communication unit to transmit data bursts to the base station or to receive data bursts from the base station via a persistent resource region included in the first MAP message after the persistent resource de-allocation section.

15. The mobile station according to claim 11, wherein the controller is further configured to control the wireless communication unit to:
receive a second MAP message from the base station, the second MAP message including resource allocation information for a persistent resource de-allocation section; and
transmit uplink data bursts to the base station via a resource allocation region contained in the resource allocation information.

16. The mobile station according to claim 11, wherein the first MAP message corresponds to a persistent allocation A-MAP.

17. The mobile station according to claim 15, wherein the second MAP message is a basic assignment A-MAP IE.

18. The mobile station according to claim 11, wherein the temporal de-allocation is a one-time de-allocation.

19. The mobile station according to claim 11, wherein:
the first MAP message further includes persistent resource allocation period information; and
the persistent resource de-allocation type information is included in the first MAP message when the persistent resource allocation period information indicates de-allocation.

20. The mobile station according to claim 13, wherein the temporal de-allocation is a one-time de-allocation.

* * * * *